US010104163B1

United States Patent
Stickle et al.

(10) Patent No.: US 10,104,163 B1
(45) Date of Patent: Oct. 16, 2018

(54) SECURE TRANSFER OF VIRTUALIZED RESOURCES BETWEEN ENTITIES

(71) Applicant: Amazon Technologies, Inc., Seattle, WA (US)

(72) Inventors: Thomas Charles Stickle, Saint James, NY (US); Ryan Christopher Holland, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 313 days.

(21) Appl. No.: 14/811,609

(22) Filed: Jul. 28, 2015

(51) Int. Cl.
  *G06F 15/173*  (2006.01)
  *H04L 29/08*   (2006.01)
  *H04L 29/06*   (2006.01)

(52) U.S. Cl.
  CPC .............. *H04L 67/10* (2013.01); *H04L 63/10* (2013.01)

(58) Field of Classification Search
  CPC ................................ H04L 67/10; H04L 63/10
  See application file for complete search history.

(56) References Cited

U.S. PATENT DOCUMENTS

| 7,698,229 B2 * | 4/2010 | Hsu | G06F 21/10 705/51 |
| 2004/0088231 A1 * | 5/2004 | Davis, Jr. | G06Q 10/087 705/28 |
| 2008/0077992 A1 * | 3/2008 | Lee | G06F 21/10 726/26 |
| 2013/0132457 A1 * | 5/2013 | Diwakar | G06F 9/5072 709/201 |
| 2014/0040892 A1 * | 2/2014 | Baset | G06F 9/455 718/1 |

* cited by examiner

*Primary Examiner* — John B Walsh
(74) *Attorney, Agent, or Firm* — Thorpe North & Western, LLP.

(57) ABSTRACT

Technology is described for providing a secure transfer of a virtual computing resource between at least two entities in a computing environment. An ownership transfer account is created and configured to enable a transfer of virtual computing resources between a first customer account and a second customer account of a service provider network hosted within a service provider environment, using one or more computing systems. Virtual computing resources owned by the first customer account are tagged using the one or more computer systems. The ownership of the virtual computing resources that are tagged is transferred to the ownership transfer account, using the one or more computer systems. The transfer of the virtual computing resources to the ownership transfer account is verified. The ownership of the virtual computing resources is transferred from the ownership transfer account to the second customer account.

20 Claims, 9 Drawing Sheets

SECURE TRANSFER OF VIRTUALIZED RESOURCES BETWEEN ENTITIES

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

Virtualization technologies may be used to execute a computing resources that provide, for example, Infrastructure as a Service ("IaaS"), Platform as a Service ("PaaS"), and/or Software as a Service ("SaaS"). Launching computing resources may involve launching various virtualized computing resource components that may include: one or more computing instances, software services, subnets, virtualized storage, as well as other computing resources. Some computing resource components may launch sequentially, while other computing resource components may launch in parallel. After the computing resource components have launched, a customer may be provided access to the computing resource group. Given the increasing use of virtualized technology and sharing of physical computing resources amongst multiple customers, the ability to share virtualized computing resources has also become more valuable.

DETAILED DESCRIPTION

Figure 1:
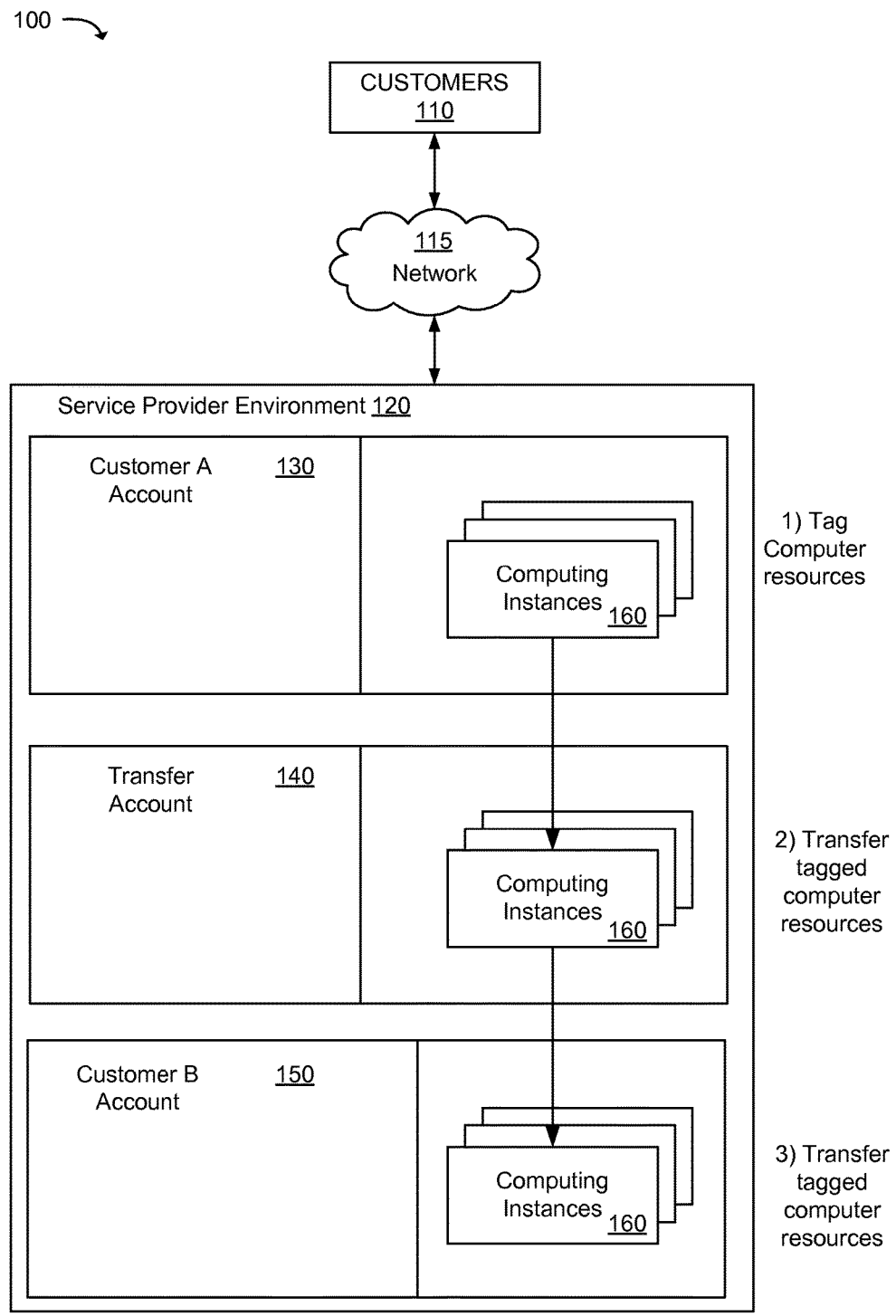
FIG. 1 illustrates a system for secure transfer of virtual computing resources between a first customer account and a second customer account in a service provider environment according to an example of the present technology.

A technology is described for secure transfer of virtual computing resources between a first customer account and a second customer account. In one aspect, the technology provides for a secure transfer of a virtual computing resource between at least two entities or customer accounts in a computing environment or virtualized service provider environment. In one configuration, the transfer of ownership of may take place which also results in transfer of the virtual computing resources. A transfer account may be created and configured to enable a transfer of virtual computing resources between a first customer account and a second customer account within a service provider network hosted within a service provider environment. Virtual computing resources owned by the first customer account may be tagged. Examples of virtual computing resources may be computing instances, block storage, software machine images, load balancers, archive storage, logs, NoSQL (No Structured Query Language) data stores, virtualized data stores, virtualized relational databases, virtualized network appliances (e.g., network address translation (NAT), gateways, firewalls), virtual private clouds, and other virtual computing resources.

To undertake the secure transfer, the ownership of the tagged virtual computing resources owned by the first customer account may be transferred to the transfer account. In one aspect, the virtual computing resources are tagged in order to indicate that the virtual computing resources are to be transferred. That is, in one aspect, only tagged virtual computing resources may be transferred. The transfer of the tagged virtual computing resources to the transfer account may be verified (e.g., a determination is made to verify if the transfer operation successfully completed transfer of the tagged virtual computing resources). In one aspect, a list of tagged virtual computing resources may be maintained and updated. As part of the verification operation, a transfer service may compare the tagged virtual computing resources that have been transferred to the list of those virtual computing resources marked or tagged for transfer. If the number of tagged virtual computing resources that have been transferred matches the list of those virtual computing resources marked or tagged for transfer then the transfer can be verified and acknowledged as complete. Alternatively, if the number of tagged virtual computing resources that have been transferred does not match the list of those virtual computing resources marked or tagged for that specified transfer, the verification operation can be marked as an incomplete or failed transfer. At that point, a transfer service may attempt to re-transfer those remaining or "left-behind" tagged virtual resources to the transfer account. A second verification operation may be performed to verify if the re-transfer operation successfully completed transfer of each and every tagged virtual computing resource. The ownership of the tagged virtual computing resources may then be transferred from the transfer account to the second customer account.

In one aspect, the transfer service allows for the transfer of computing resources or assets within a service provider environment between at least a first party ownership account and a second party ownership account, and the transfer may be facilitated by a trusted third party or vendor partner (rather than the service provider environment) which may create and manage a transfer account. Access to the transferred computing resources at any given time is restricted to one of the parties ownership accounts associated with the transfer. That is, the transfer account is a single-tenant account.

In another example aspect, the transfer service may allow a system integrator (SI) or other partner to create a secured environment within an account owned by the SI/partner. The secured environment may then be moved into a customer account via the secure transfer account without the customer needing to provide the system integrator with access to the customer account. More specifically, a secure transfer of virtual computing resources between a first customer account and a second customer account allows a SaaS provider(s) to re-create a single-tenant environment for a customer of the SaaS product. The single-tenant environment deployment may then be transferred to and executed within a customer computing environment account. In one scenario, the secure transfer of the virtual computing resources may provide the benefit of enabling divestiture of business assets or corporate sales of business computing resources while allowing for an orderly transfer of virtual computing assets from a source customer ownership account to a target customer ownership account.

In one example aspect, the secure transfer of virtual computing resources enables the moving of virtual computing resources for a trial or demo setup owned by a third party into a product account owned by a customer. For example, assume customers are allowed to run or test out (e.g., prior to purchase) a pre-configured application in a sandbox owned by the partner for a set period of time, such as 2 to 4 hours. The secure transfer of virtual computing resources using the transfer service may allow a customer to extend the period of time for testing the application or environment to a longer period of time (e.g., longer than 2 to 4 hours) while having the virtual computing resources associated, located and/or paid for within the customer's account (as compared to be being paid for, and under the control of the third party partner). More specifically, the ownership of virtual computing resources may be transferred from the vendor to the customer via the transfer account that is secure. Then the customer may later determine whether to purchase the virtual computing resources that were tested.

In one aspect, the technology provides for a secure transfer of virtual computing resources between at least two entities in a computing service environment by transferring of configurations of virtual computing resources. A transfer account may be created to facilitate a transfer of virtual computing resources between a first customer account and a second customer account The transfer of the virtual computing resources to the transfer account may be verified by the first customer account, the second customer account, and/or by the transfer account. The ownership of the virtual computing resources may be transferred from the transfer account to the second customer account by sending configuration data to the transfer account to enable virtual computing resources to be re-instantiated in the second customer account by either the transfer account, the transfer service or the second customer account. For example, if a computing instance is to be transferred to the second customer account, a configuration of the computing instance may be captured. Then a new computing instance with the configuration of the original computing instance in the first customer account may be launched into the second customer's account.

The orchestration of the secure transfer of virtual computing resources allows a source customer account to tag a set of computing resource or computing assets that are to be delivered to a target customer account without the source customer account ever having access to the security configurations or computing resources in the target customer account. Moreover, the target customer account may be restricted from having access to the source customer account (e.g., the sending customer account). Through the use of a transfer account (e.g., a transfer deposit or holding account where access thereto may be granted and removed as needed) and the ability to modify the account ownership of the virtual computing resources in a single-tenant account to complete a secure transfer, the transfer service may perform each of the following. The transfer service may send tags (e.g., transfer records) to a transfer service for the virtual computing resources that need to be transferred, which may include computing instances, software machine image, storage volumes, objects, such as web enable object storage, and the like. A list of computing resources, including a receiving account number, may be sent to the transfer service. The source customer account may send a request for permission to transfer and/or receive permissions to send the transfer of the virtual computing resources. Upon acceptance of the transfer request by the target customer account, a transfer service may move the virtual computing resources from the sending account into a new transfer account. After the virtual computing resources are copied and/or transferred to a transfer account, the source customer account may be given full access to the transfer account to verify the transfer and perform any additional configuration that might be needed. The configuration operation allows the second customer account to configure the transferred virtual computing resources so as to be used by the second customer account. The virtual computing resources may be configured for use by the second customer account, subsequent to transferring ownership of the virtual computing resources from the transfer account to the second customer account, according to one or more policies, rules, configuration schemes, attributes, and/or purposes. Once the source customer account confirms the transfer and acknowledges the transfer is complete, the service provider may remove any access by the source customer account to the transfer account and change ownership of the virtual computing resources to the target customer account. The target customer account may include the transferred virtual resources within the target customer account and exercise exclusive ownership over the transferred virtual resources.

FIG. 1 illustrates a system 100 for secure transfer of cloud resources between a first customer account and a second customer account according to an example of the present technology. The system 100 may include one or more customers 110, an external computing network 115 (e.g., the internet), and a service provider environment 120. The service provider environment 120 may include one or more customer accounts, such as customer A account 130, and customer B account 150, which may be associated with one or more customers 110. The network 115 may include the Internet, intranets, extranets, wide area networks (WANs), local area networks (LANs), wired networks, wireless networks, or other suitable networks, etc., or any combination of two or more such networks.

The service provider environment 120 may also include a transfer account 140. In one aspect, the transfer account 140 may be a single-tenant environment and may be created and managed by the service provider environment 120. In one aspect, the transfer account 140 may be created and configured to enable a transfer of virtual computing resources (e.g., the computing instances 160 and block transfer storage) between the customer A account 130 and the customer B account 150 within a service provider network hosted within the service provider environment 120. As depicted in step 1) one or more of computing instances 160 owned by the first customer account may be tagged. As depicted in step 2) the computing instances 160 that are tagged may be transferred to the transfer account 140.

In one aspect of the technology, there may a condition precedent before releasing the one or more virtual computing resources or computing instances 160 for transfer. For example, the transfer account 140 may be configured to wait for transferring virtual computing resources until receiving some specified acknowledgment, authorizations, agreement, and/or performances (e.g., electronic signature or software platform previously installed) prior to transfer. In one example, a payment may be received before a transfer may take place. In another example, customer A account 130 may secure an acknowledgment from the customer B account 150 granting permission for transferring from the customer A account 130 to the customer B account 150. Failure to receive a condition precedent, such as permission, prohibits the transfer of the computing instances 160.

The transfer of the computing instances 160 to the transfer account 140 may also be verified by the customer A account 130 and/or by the transfer account 140. As depicted in step 3) the computing instances 160 that are tagged may be transferred from the transfer account 140 to the customer B account 150. The transfer of the computing instances 160 from the transfer account 140 to the customer B account 150 may also be verified by the customer B account 150 and/or by the transfer account 140.

The transfer service may allow for the transfer of computing resources or assets within a service provider environment between one sending ownership account and N or more receiving ownership accounts. In one aspect, the virtual computing resources or assets may be transferred to a transfer account and then sent on to two or more separate receiving ownership accounts that are receiving the virtual computing resource. For example, the sending ownership account may tag a first set of one or more virtual computing resources or assets that are to be transferred to a receiving ownership account X. In addition, the first party ownership account may tag a second set of one or more computing resources or assets that are to be transferred to a second receiving ownership account Y and so on. Thus, when a transfer is initiated, the transfer will occur between a first sending party and multiple receiving parties who receive selected (but separate) portions of the assets being transferred.

In a similar configuration to the paragraph above, the transfer service may allow for the transfer of computing resources or assets within a service provide environment between at least a first party ownership account and one or more receiving party ownership accounts using multiple transfer accounts. That is, a trusted third party or vendor partner (rather than the service provider environment) may create and manage at least one or more transfer accounts. In one aspect, the computing resources or assets may be split up and transferred to multiple transfer accounts. For example, the first party ownership account may tag a first set of one or more computing resources or assets that are to be transferred to a first alternative transfer account. Next, the first party ownership account may tag a second set of one or more computing resources or assets that are to be transferred to a second alternative transfer account. Similarly, the first party ownership account may tag an nth set having one or more computing resources or assets that are to be transferred to an nth alternative transfer account. Each of these multiple transfer accounts may allow a receiving party or receiving account to receive virtual computing resources from that transfer account.

Figure 2:
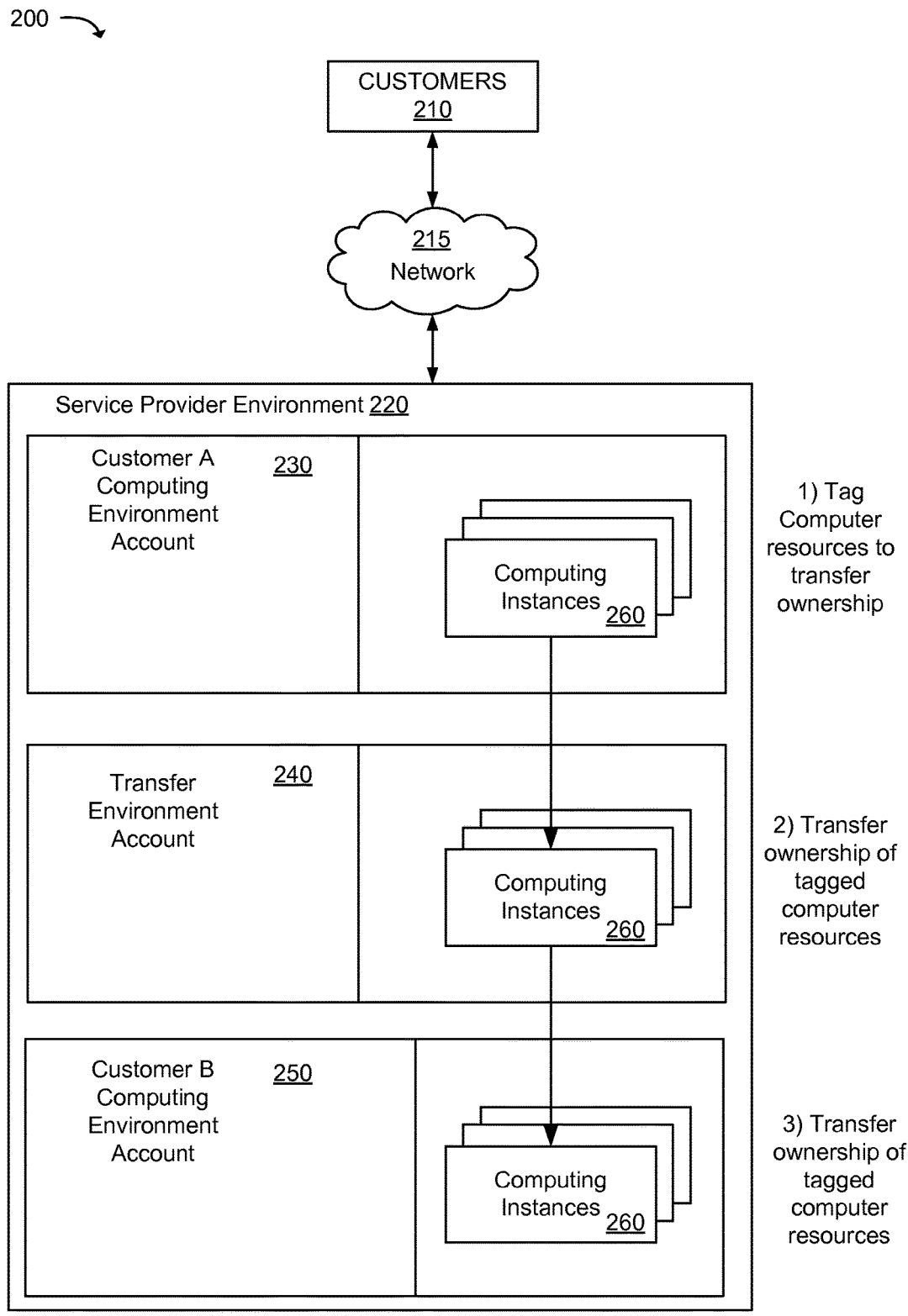
FIG. 2 illustrates a system for secure transfer of ownership of virtual computing resources between a first customer computing environment account and a second customer computing environment account in a service provider environment according to an example of the present technology.

FIG. 2 illustrates a system 200 for secure transfer of the ownership of virtual computing resources between a first customer computing environment account and a second customer computing environment account according to an example of the present technology. The system 200 may include one or more customers 210, a computing network 215, and a service provider environment 220. A service provider environment 220 may include one or more customer accounts, such as customer A computing environment account 230, and customer B computing environment account 250, which are associated with one or more customers 210. The network 215 may include the Internet, intranets, extranets, wide area networks (WANs), local area networks (LANs), wired networks, wireless networks, or other suitable networks, etc., or any combination of two or more such networks.

The service provider environment 220 may also include a transfer account 240. Further, the transfer account 240 may be created and configured to enable a transfer of ownership of virtual computing resources (e.g., the computing instances 260) between the customer A computing environment account 230 and the customer B computing environment account 250 within a service provider network hosted within the service provider environment 220. As depicted in step 1) one or more computing instances 260 owned by the first customer account may be tagged. As depicted in step 2) ownership of one or more computing instances 260 (e.g., virtual computing resources) that are tagged may be transferred to the transfer account 240. The transfer of ownership of the computing instances 260 to the transfer account may also be verified by the computing account 230 and/or by the transfer account 240. As depicted in step 3) the ownership of the computing instances 260 may be transferred from the transfer account 240 to the customer B computing environment account 250. The transfer of the ownership of the computing instances 160 from the transfer account 240 to the customer B computing account 250 may also be verified by the customer B computing account 250 and/or by the transfer account 240.

Figure 3:
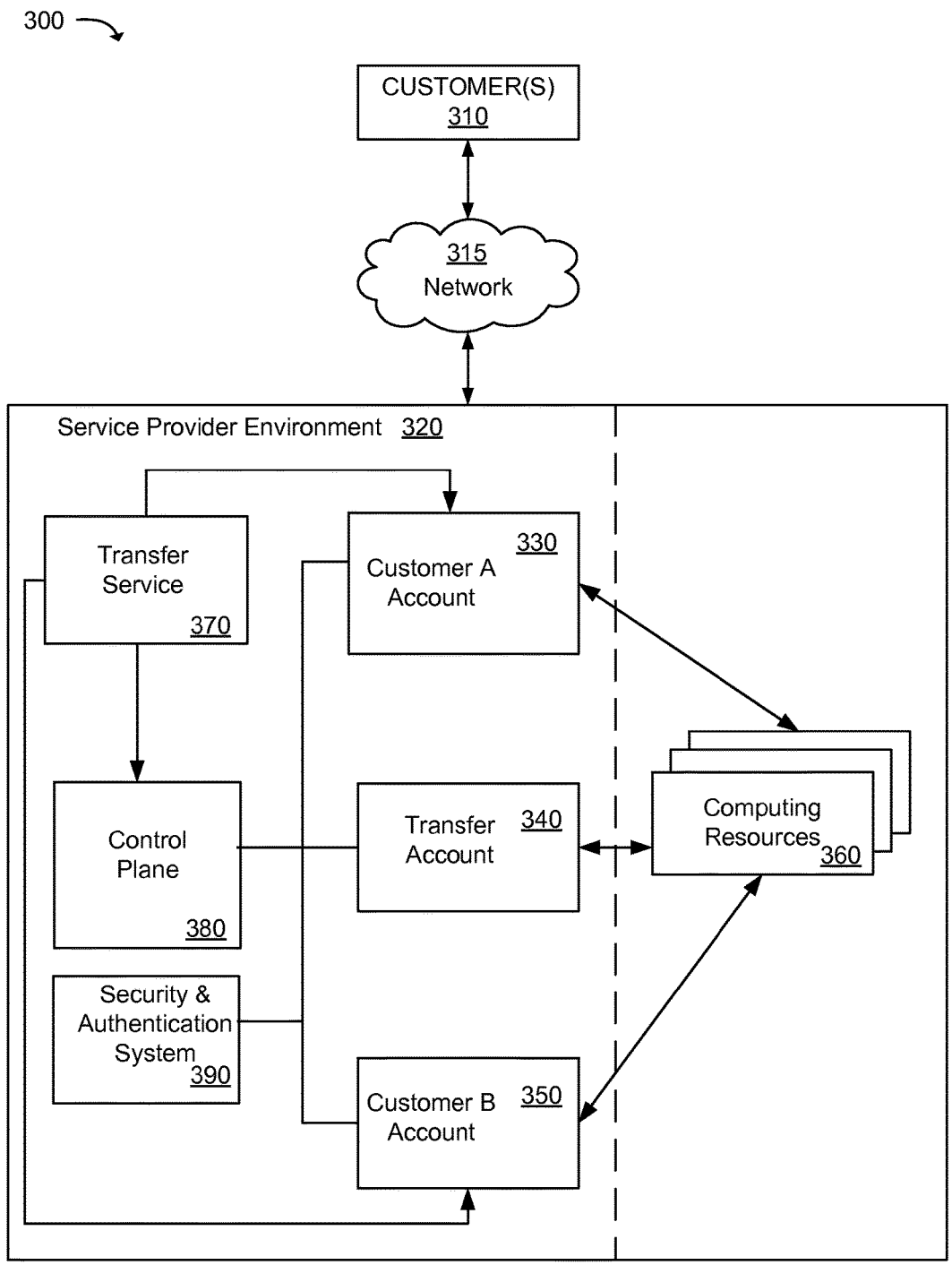
FIG. 3 illustrates a system for transferring ownership of the virtual computing resources between customer accounts and a transfer account in a service provider environment according to an example of the present technology.

FIG. 3 illustrates a system 300 for transferring ownership of the virtual computing resources between customer accounts using a transfer account according to an example of the present technology. The system 300 may include one or more customers 310, a computing network 315, and a service provider environment 320. The service provider environment 320 may include one or more customer accounts, such as customer A account 330, and customer B account 350, which are associated with one or more customers 310, and the customer accounts may be able to communicate with a transfer service 370, and a control plane 380. The control plane 380 may include and/or be in association with an security and authentication service 390.

The security and authentication service may provide authentication and access services for the customer accounts and the transfer service.

The service provider environment 320 may also include a transfer account 340 (e.g., a transfer account). The transfer account 340 may be a single-tenant account that is created and managed by the service provider environment 320.

In one aspect, a control plane 380 may assist with certain technical aspects of the secure transfer of the virtual computing resources 360 (e.g., the computing instances) or virtualized computing services. The control plane 380 may enable access to a graphically-based user interface (e.g., a web based console interface) configured to enable customers 310 of the service provider environment 320 to provision, de-provision, configure, and/or reconfigure (collectively, "provision") suitable aspects of the transfer service 370. For example, a customer 310 desiring to enable the secure transfer of virtual computing resources may request the transfer of one or more virtual computing resources 360 using the transfer service 370. The user may then mark or tag the provisioned virtual computing system instances to provide secure transfer of virtual computing resources and execute the virtual computing resources.

The control plane 380 may further enable the customers 310 to specify and/or re-specify virtualized computing service policies for secure transfer of cloud resources system using the transfer service 370. Such policies may be maintained and enforced by the control plane 380. Additionally, the control plane 380 may be configured to use the security and authentication service 390 for identifying and/or verifying when a customer 310 is requesting and/or using the secure transfer of cloud resources for providing secure transfer of virtual computing resources from one customer to another using the transfer account 340.

In one aspect, the transfer account 340 may be created and configured to enable a transfer of virtual computing resources 360 (e.g., the computing instances) between a customer A account 330 and the customer B account 350 within a service provider network hosted within a service provider environment 320. In one aspect, the transfer account 340 may be a single-tenant environment and may be created and/or controlled by the service provider.

For example, assuming a customer 310 (e.g., a source customer, such as customer A account 330) is interested in transferring virtual computing resources to a target customer (e.g., customer B account 350). The customer 310 of customer A account 330 may communicate via the network 315 with the transfer service 370. The transfer service 370 may, on behalf of the customer A account 330, send a request or notification to the customer B account 350 indicating a request or permission to transfer virtual computing resources to the customer B account 350 via the transfer account 340. The customer B account 350 may also use the transfer service 370 for communicating and replying to the customer A account 330 indicating approval and/or denial to transfer virtual computing resources to the customer B account 350.

In one aspect, the customer A account 330 may work in association with the transfer service 370 and may tag the computing resources 360 owned by the customer A account 330. The ownership of the computing resources 360 that are tagged may be transferred using the transfer service 370 to the transfer account 340. The transfer of the computing resources 360 to the transfer account 340 may also be verified by the customer A account 330 using the control plane 380 and the security and authentication service system 390. The ownership of the computing resources 360 may be transferred to the customer B account 350 as directed by the transfer service 370 and using the transfer account 340.

The ownership of virtual computing resources may be created, managed and destroyed by the control plane 380. Ownership tables may associate a customer account with unique object identifiers for the virtual computing resources and this association may represent a customer account's ownership of the virtual computing resource. When the virtual computing resource is moved or the ownership of the virtual computing resource is transferred between accounts, the transfer service may request changes to the ownership tables in the control plane. Thus, the unique object identifier for a virtual computing resource may be associated with the transfer account and the target customer account as a transfer of the virtual computing resources occurs. The ownership tables may also be associated with the customer account which may have one or more policies related to the virtual computing resources. Also, the ownership tables may include and/or be associated with a dependency graph for virtual computing resources. The dependency graph may include a list of resources and/or applications that depend from each virtual computing resource. The dependency graph may also include a list of those resources and/or applications from which each virtual computing resource depends. This allows policies and dependencies to be checked using a dependency operation when transferring the virtual computing resources.

Moreover, the dependency graph or dependency list may be used in association with transferring ownership. For example, instructions may be provided and executed for transferring ownership of the virtual computing resources from the first customer account, to the ownership transfer account, and/or to the second customer account by sending at least a portion of the configuration data to the ownership transfer account to enable virtual computing resources to be re-instantiated in the second customer account. As such, the dependency for transferring the ownership of the virtual computing resources may be included with the instructions and/or associated with configuration data. Also, the dependencies may be updated, altered, added, and/or removed to allow at least a portion of the configuration data to be transferred from the first customer account to the ownership transfer account, and/or directly to the second customer account to enable virtual computing resources to be re-instantiated in the second customer account. Dependencies may include, but not limited to, at least application dependencies, server dependencies, configuration data, secrets, log file locations, notification services (e.g. a managed push notification service for sending out individual messages or to fan-out messages to large numbers of recipients), resource names (e.g., resource identifiers to uniquely identify a resource), identity and access management users and credentials, hardware security module (HSM) keys, and/or other dependencies upon which an applicationor computing resources (e.g., computing instances) may depend.

In an example regarding policies, a specified policy, rule, and/or attribute for virtual computing resources may only grant access to a specified type of customer. However, the policies, rules, and/or attributes associated with the virtual computing resources, such as the computing resources 360, may be altered, changed, removed, added, and/or updated as needed in order to either perform a transfer or prevent a transfer of the virtual computing resources. For example, if the customer A account 330 intends to transfer (to the customer B account 350) the computing resources 360 that are tagged to the transfer account 340, a dependency check may be performed to analyze policies and/or dependence that may allow or prohibit the transfer of the computing resources 360. If, for example, a policy prohibits the customer B account 350 from accessing the computing resources 360 owned by the customer A account 330, the policy may be changed or updated. In other words, policies and rules may be edited, modified, added, and/or deleted for transferring the virtual computing resources, such as the computing resources 360.

The transfer of the computing resources 360 to the transfer account 340 may also be verified by the customer A account 330 using the control plane 380 and the security and authentication service system 390.

As part of the transferring operation, the control panel 380 may also determine whether to transfer the tagged computing resources 360 that are owned by the customer A account 330 to the transfer account 340 and from the transfer account 340 to the customer B account 350 by: 1) a hot transfer, 2) a suspended execution transfer, and/or 3) a configuration transfer. For example, a hot transfer may be a transfer where one or more of the computing resources 360 are still executing in the service provider environment 320 while the ownership of the one or more virtual computing resources 360 (e.g., computing instances) is being transferred. A suspended execution transfer (e.g., static state transfer) of the virtual computing resources may be a transfer of one or more virtual computing resources 360 (e.g., computing instances) that are not executing in the service provider environment 320 while the ownership of one or more virtual computing resources 360 (e.g., computing instances) are being transferred. Specifically, an image of the suspended virtual computing resource or object may be captured, and that image may be re-instantiated and transferred to the target account.

A configuration transfer may be a transfer where configuration data of one or more virtual computing resources 360 (e.g., computing instances) that are to be transferred is transferred from the source customer account (e.g., the customer A account 330) to the transfer account 340. This configuration data may be used for re-instantiating the virtual computing resource in the transfer account 340 and/or in the target customer account, such as the customer B account 350.

Figure 4:
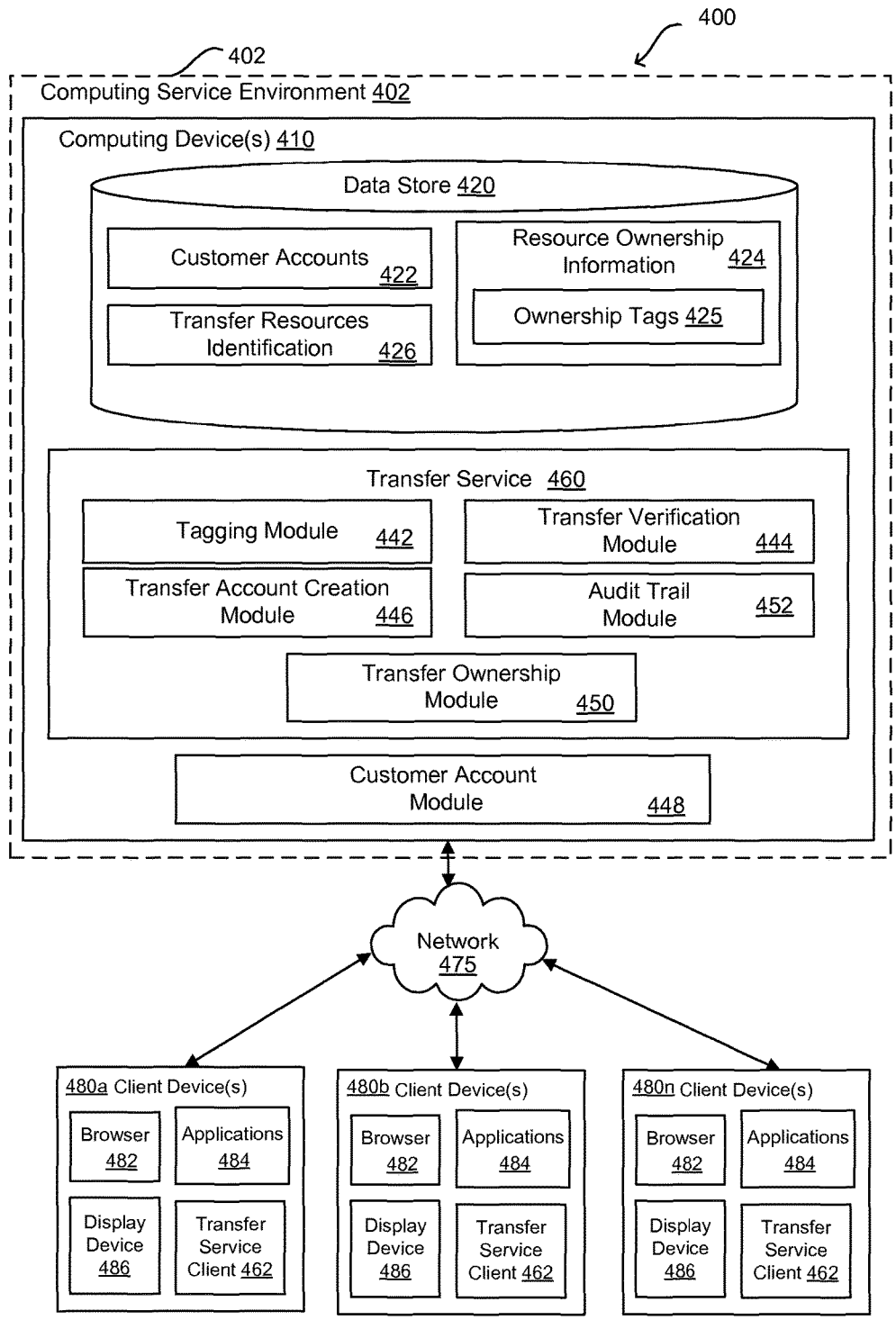
FIG. 4 illustrates a system for secure transfer of virtual computing resources according to an example of the present technology.

FIG. 4 illustrates a system 400 for secure transfer of virtual computing resources according to an example of the present technology. In the following discussion, a general description of an example centralized system for secure transfer of cloud resource between at least two entities in a computing environment is provided. The general description is followed by a discussion of the operation of the components in a system for the technology.

FIG. 4 illustrates a system 400 having a networked computing environment according to one example of the present technology. The system 400 may include a service provider environment 402 that may include one or more computing devices 410. The system 400 may include one or more computing devices 410 in data communication with a client device 480a-n (illustrated in FIG. 4 as one or more client devices, such as client devices 480a, 480b, and 480n) by way of a network 475. The network 475 may include the Internet, intranets, extranets, wide area networks (WANs), local area networks (LANs), wired networks, wireless networks, or other suitable networks, etc., or any combination of two or more such networks.

Various applications, services and/or other functionality may be executed in the computing device 410 according to varying configurations. Also, various data may be stored in a data store 420 that is accessible to the computing device 410. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store 420 may include storage systems such as a SAN (Storage Area Network), cloud storage network, volatile or non-volatile RAM, optical media, or hard-drive type media. The data stored in the data store 420, for example, may be associated with the operation of the various applications and/or functional entities described below.

The data stored in the data store 420 may include available customer information and identification data included within a list of customer accounts 422. The list of customer accounts 422 may also be associated with ownership records 425 or have electronic links to ownership records 425 added from the resource ownership information 424 associated with one or more customer accounts 422, and the customer accounts may be managed by the customer account module 448.

The list of customer accounts 422 and respective a list of transfer tags may be associated with the transfer resources identification 426 of a customer accessing the computing device 410 and authenticating the client devices 480a-n. The list of customer accounts 422 may be limited to customer accounts 422 that have various resources that have been transferred or the various resources that are to be transferred, which are listed in the transfer resources identification 426.

The resource ownership information 424 may identify ownership of transferred resources. More specifically, the resource ownership information 424 may link to the list of customer accounts 422 or store a listing of customer accounts having ownership of computing resources. The resource ownership information 424 may be accessed for adding, deleting, transferring, moving, copying, and/or recording ownership records (e.g., ownership records 425) for assisting with 1) tagging virtual computing resources that are to be transferred and 2) transferring ownership of the virtual computing resources using the transfer service 460. The resource ownership information 424 may contain the ownership record 425 information for enabling a virtual computing resource to be added to a customer account 422. The ownership records 425 may be selected from the resource ownership information 424, such as, for example, by using a search query, and/or a lookup operation.

A transfer account created by the transfer account creation module 446. The transfer account may operate like another customer account 422 but the transfer account may be controlled by the service provider environment. Further, the transfer account may have its own set of permission as defined by the service provider environment.

The data store 420 may be in communication with both the transfer service 460 and the customer account module 448 to assist with data used for the functions of the transfer service 460. In one aspect, the transfer resources identification 426 may be used by the transfer service 460, which may also have access to the customer account module 446. The transfer account creation module 446 may be provided in association with the transfer service 460 for creating a transfer account to facilitate a transfer of virtual computing resources between a first customer account and a second customer account within a service provider network hosted within a service provider environment.

The components executed within the transfer service 460 may include a tagging module 442, a transfer verification module 444, the transfer account creation module 446, a transfer ownership module 450, an audit trail module 452, and other service functions or applications, services, processes, systems, engines, or functionality not discussed in detail herein.

The tagging module 442, the transfer verification module 444, the transfer account creation module 446, the customer account module 448, the transfer ownership module 450, and the audit trail module 452 may each be located within the transfer service 460. Alternatively, the tagging module 442, the transfer verification module 444, the transfer account creation module 446, the customer account module 448, the transfer ownership module 450, and the audit trail module 452 may each be separate from, but associated with, the transfer service 460. Also, the customer account module 448 may be separate from, but associated with, the transfer service 460.

The transfer service 460 may create a transfer account, using the transfer account creation module 446, and the transfer account may be configured to enable a transfer of virtual computing resources between a source customer account and a target customer account within a service provider network hosted within a service provider environment.

The transfer service 460, in association with the tagging module 442, may tag virtual computing resources owned by the source customer account. The tags may be created in response to a user selecting a number of virtual computing resources that are to be transferred.

The transfer service 460 may identify, using the transfer verification module 444, virtual computing resources that are tagged for transfer to a transfer account created by the transfer account creation module 446. The transfer service 460 may notify one or more customers associated with the transfer resources identification 426 for requesting permission to transfer the ownership of the virtual computing resources from a source customer account to a transfer account and/or to a target customer account.

The transfer service 460, using the transfer ownership module 450, may transfer ownership of the virtual computing resources from the source customer account to the transfer account, and/or from the transfer account to the target customer account. In one configuration a transfer of a virtual computing resource may occur by sending configuration data to the transfer account to enable a virtual computing resource to be re-instantiated in the transfer account. The transfer service 460, using the transfer ownership module 450, may determine whether to transfer the virtual resource via 1) a hot transfer (e.g., where the virtual computing resources are still executing in the service provider environment while the ownership of the virtual computing resources is being transferred), 2) a suspended execution transfer of the virtual computing resources (e.g., the virtual computing resources are static), and/or 3) a configuration transfer where configuration data is transferred to the transfer account for being re-instantiated in the transfer account.

In one aspect, the transfer service 460 may send a notification to the target customer account to enable a user who owns the target customer account to accept or deny the transferring of ownership of the virtual computing resources from the source customer account. If the notification is accepted by the user, then the transfer may proceed. If the notification is denied by the user, then the transfer to the target customer account is canceled.

In one aspect, the audit trail module 452 may maintain and provide an audit trail relating to the transfer of ownership of the virtual computing resources. In addition, the transfer service 460 and audit trail module 452 may be configured for delivering notifications and audit updates of each transferred virtual computing resource.

In one aspect, the transfer service 460 may remove access permissions from the source customer account to the transfer account to enable access by the target customer account, which may be granted access permissions to the transfer account. This is because the transfer account is single tenancy. For example, when the transfer account is created, only the source customer account is granted access to the transfer account. After the source customer transfers the virtual computing resources using the transfer service 460, the access permissions to the transfer account are removed from the source customer account and the access permission may be transferred to the target customer account for accessing the transfer account.

The transfer service 460 may be associated with a customer account module 448. The customer account module 448 may include an ownership table and a dependency graph or dependency list. The customer account module 448 may be configured to receive updated information relating to virtual computing resource transfers. For example, the customer account module 448 may include policies, rules, and/or attributes relating to the virtual computing resource. These policies, rules, and/or attributes relating to the virtual computing resource may be updated, altered, removed, and/or added for either preventing and/or allowing the transfer of virtual computing resource. In addition, the customer account module 448 may include the functionality to transfer ownership of transfer ownership records of the virtual computing resources that have been tagged from the target customer account to the transfer account and may include the functionality of recording the transferring of ownership of transfer records.

Certain processing modules may be discussed in connection with this technology and FIG. 4. In one example configuration, a module of FIG. 4 may be considered a service with one or more processes executing on a server or other computer hardware. Such services may be centrally hosted functionality or a service application that may receive requests and provide output to other services or user devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 410 may comprise, for example, a server computer or any other system providing computing capability. Alternatively, a plurality of computing devices 410 may be employed that are arranged, for example, in one or more server banks, computer banks or other computing arrangements. For example, a plurality of computing devices 410 together may comprise a clustered computing resource, virtualization server, a grid computing resource, and/or any other distributed computing arrangement. Such computing devices 410 and data stores 420 may be located in a single installation or may be distributed among many different geographical locations. For purposes of convenience, the computing device 410 is referred to herein in the singular. Even though the computing device 410 is referred to in the singular, it is understood that a plurality of computing devices 410 may be employed in the various arrangements as described above.

The client device 480 may be representative of a target device, social media sites, and/or content sites that may be coupled to the network 475. The client device 480 may comprise, for example, a processor-based system such as a computer system. Such a computer system may be embodied in the form of a desktop computer, a laptop computer, personal digital assistants, cellular telephones, smartphones, voice-controlled playback devices (e.g., smart speakers), set-top boxes, network-enabled televisions, music players, tablet computer systems, game consoles, electronic book readers, or other devices with like capability. The client device 480 may be configured to execute various applications such as a browser 482, and/or other applications 484. The applications 484 may correspond to code that is executed in the browser 482 (e.g., web applications). The applications 484 may also correspond to standalone applications, such as networked applications. The applications 484 may include and/or be associated with one or more transfer service client 462 that are executed on the client device 480 as directed by the transfer service 460.

The client device 480 may include or be coupled to a display device 486. The browser 482 may be executed on the client device 480, for example, to access and render network pages (e.g. web pages) or other network content served up by the computing device 410 and/or other servers. The display device 486 may comprise, for example, one or more devices such as cathode ray tubes (CRTs), liquid crystal display (LCD) screens, gas plasma-based flat panel displays, LCD projectors, or other types of display devices, etc. In addition, the display device 486 may include an audio device, tactile device (e.g., braille machine) or another output device to feedback to a customer.

In one configuration, the transfer service client 462 may be an application functioning on the client device 480 configured to assist with the secure virtual resources transfer as it relates to the client device 480 and/or provide secure virtual resources transfer notification to the client device 480. For example, the transfer service client 462 may be an application installed on a smart phone. In the event that that transfer service 460 transfers, for example, one or more virtual computing resources, the transfer service client 462 may receive updates from the transfer service 460 via the network 475. The transfer service client 462 may then provide, for example, and audio and/or a visual alert to the client device 480. The transfer service client 462 may publish or display the alert notification in a content site, a display ticker, a pop-up window, and/or short message service (SMS) message (e.g., a text message) or other message of limited length, such as a tweet, on the client device 480.

Figure 5:
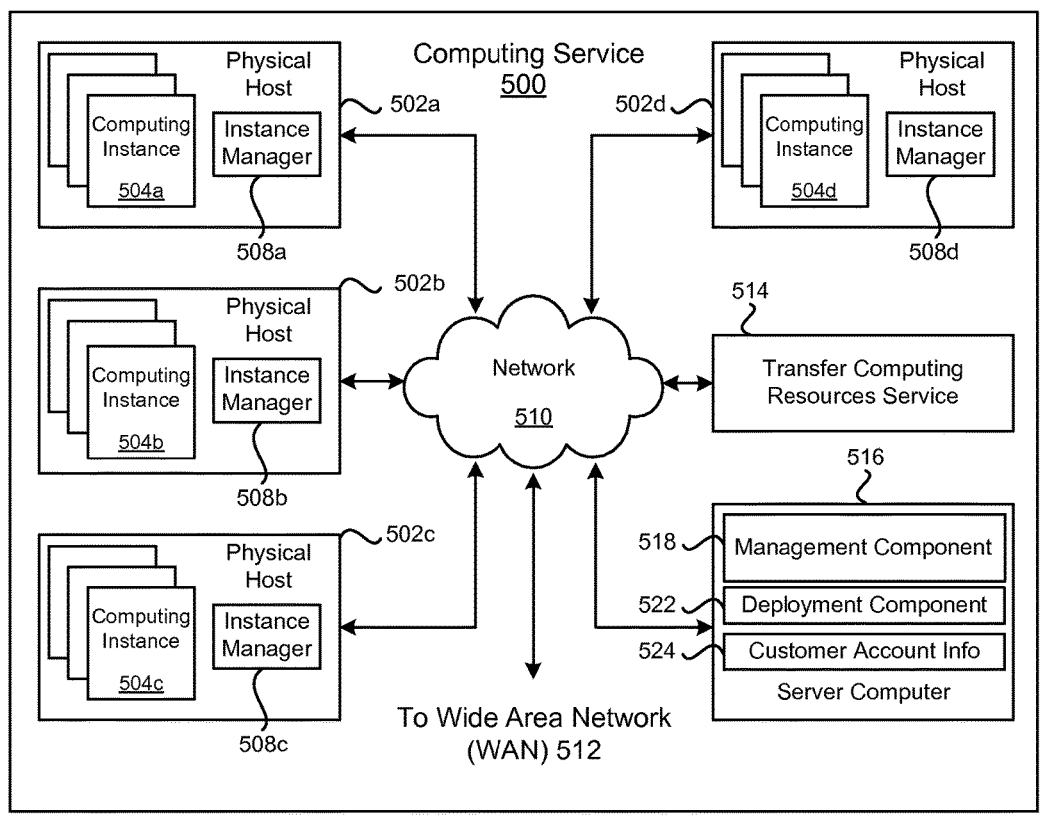
FIG. 5 is a block diagram that illustrates an example computing service environment that includes a transfer computing resources service.

FIG. 5 is a block diagram illustrating an example computing service 500 that may be used to execute software services in association with a transfer computing resources service for secure transfer of virtual computing resources. In particular, the computing service 500 depicted illustrates one environment in which the technology described herein may be used. The computing service 500 may be one type of environment that includes various virtualized service resources that may be used, for instance, to host computing instances 504a-d on which a trial computing service may execute.

The computing service 500 may be capable of delivery of computing, storage and networking capacity as a software service to a community of end recipients. In one example, the computing service 500 may be established for an organization by or on behalf of the organization. That is, the computing service 500 may offer a "private cloud environment." In another example, the computing service 500 may support a multi-tenant environment, wherein a plurality of customers may operate independently (i.e., a public cloud environment). Generally speaking, the computing service 500 may provide the following models: Infrastructure as a Service ("IaaS"), Platform as a Service ("PaaS"), and/or Software as a Service ("SaaS"). Other models may be provided. For the IaaS model, the computing service 500 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 500. End customers may access the computing service 500 using networked client devices, such as desktop computers, laptops, tablets, smartphones, etc. running web browsers or other lightweight client applications, for example. Illustratively, the computing service 500 may be described as a "cloud" environment.

The particularly illustrated computing service 500 may include a plurality of server computers 502a-d. While four server computers are shown, any number may be used, and large data centers may include thousands of server computers. The computing service 500 may provide computing resources for executing computing instances 504a-d. Computing instances 504a-d may, for example, be virtual machines. A virtual machine may be an instance of a software implementation of a machine (i.e., a computer) that executes applications like a physical machine. In the example of a virtual machine, each of the server computers 502a-d may be configured to execute an instance manager 508a-d capable of executing the instances. The instance manager 508a-d may be a hypervisor, virtual machine monitor (VMM), or another type of program configured to enable the execution of multiple computing instances 504a-d on a single server. Additionally, each of the computing instances 504a-d may be configured to execute one or more applications.

Some of the servers may be used for executing the transfer computing resources service. For example, a server computer 514 may execute a transfer computing resources service for secure transfer of virtual computing resources.

One or more server computers 516 may be reserved to execute software components for managing the operation of the computing service 500 and the computing instances 504a-d. A server computer 516 may execute a management component 518. A customer may access the management component 518 to configure various aspects of the operation of the computing instances 504a-d purchased by a customer. For example, the customer may setup computing instances 504a-d and make changes to the configuration of the computing instances 504a-d.

A deployment component 522 may be used to assist customers in the deployment of computing instances 504a-d. The deployment component 522 may have access to account information associated with the computing instances 504*a-d*, such as the name of an owner of the account, credit card information, country of the owner, etc. The deployment component 522 may receive a configuration from a customer that includes data describing how computing instances 504*a-d* may be configured. For example, the configuration may include an operating system, provide one or more applications to be installed in computing instances 504*a-d*, provide scripts and/or other types of code to be executed for configuring computing instances 504*a-d*, provide cache logic specifying how an application cache may be prepared, and other types of information. The deployment component 522 may utilize the customer-provided configuration and cache logic to configure, initialize, and launch computing instances 504*a-d*. The configuration, cache logic, and other information may be specified by a customer accessing the management component 518 or by providing this information directly to the deployment component 522.

Customer account information 524 may include any desired information associated with a customer of the multi-tenant environment. For example, the customer account information may include a unique identifier for a customer, a customer address, billing information, licensing information, customization parameters for launching instances, scheduling information, etc. As described above, the customer account information 524 may also include security information used in encryption of asynchronous responses to API requests. By "asynchronous" it is meant that the API response may be made at any time after the initial request and with a different network connection.

A network 510 may be utilized to interconnect the computing service 500 and the server computers 502*a-d*, 516. The network 510 may be a local area network (LAN) and may be connected to a Wide Area Network (WAN) 512 or the Internet, so that end customers may access the computing service 500. The network topology illustrated in FIG. 5 has been simplified, many more networks and networking devices may be utilized to interconnect the various computing systems disclosed herein.

Figure 6:
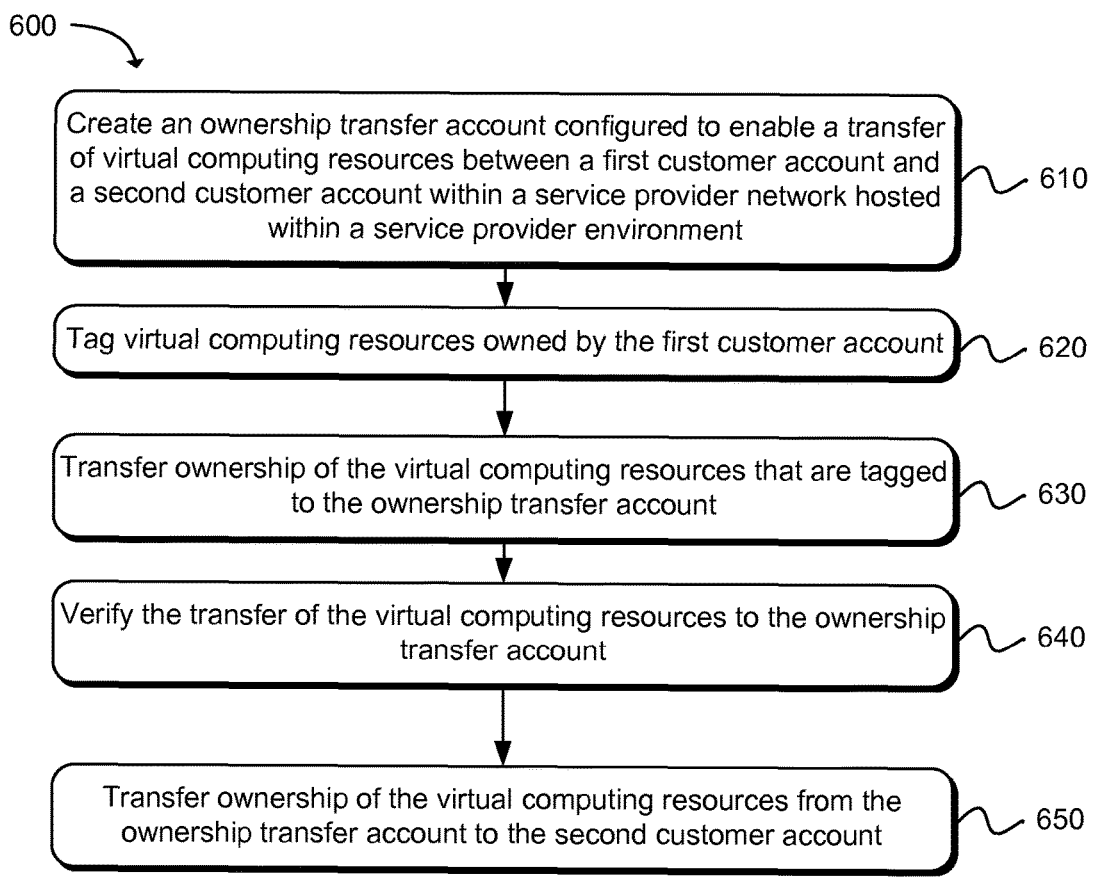
FIG. 6 is a flowchart of an example method for secure transfer of ownership of virtual computing resources between a first customer account and a second customer account according to an example of the present technology.

Moving now to FIG. 6, a flow diagram illustrates an example method 600 for a transfer service for secure transfer of virtual computing resources. The functionality may be implemented as a method and executed as instructions on a machine, where the instructions are included on at least one computer readable medium or one non-transitory machine-readable storage medium. For example, starting in block 610, an ownership transfer account (e.g., a transfer account) may be created and configured to enable a transfer of virtual computing resources between a first customer account and a second customer account within a service provider network hosted within a service provider environment. The ownership transfer account may be a single-tenant account. In one aspect, the first customer account is linked to a first customer computing environment and the second customer account is linked to a second customer computing environment. The virtual computing resources may include one or more of: computing instances, computing service images, networking resources, storage resources, and/or a combination thereof.

Virtual computing resources owned by the first customer account that are to be transferred may be tagged, as in block 620. The tag may be a simple tag that notifies the transfer server that the virtual computing resources are to be transferred. Furthermore, the tag may include additional information about the transfer such as a time to start the transfer, an amount of delay before the transfer starts, a condition precedent before a transfer is initiated, and similar transfer related information.

In one aspect, a transfer request for virtual computing resources owned by the first customer may be sent and/or received by either the first customer account and/or the second customer account. For example, the second customer account may send the first customer account a request to transfer one or more virtual computing resources owned by the first customer account to the second customer account. Alternatively, the first customer account may send the second customer account a request for permission to transfer one or more virtual computing resources owned by the first customer account to the second customer account. The request to send one or more virtual computing resources may be accepted and/or denied by the first customer account if the request is sent by the second customer account. Alternatively, the request to send one or more virtual computing resources may be accepted and/or denied by the second customer account if the request is sent by the first customer account to the second customer account. If the request is accepted, the acceptance operation may trigger the tagging operation, as described in block 610.

As in block 630, ownership of the virtual computing resources that are tagged may be transferred to the ownership transfer account. Once the transfer has been performed, the transfer operation of the virtual computing resources to the ownership transfer account may be verified (e.g., a determination is made to verify if the transfer operation successfully completed transfer of each and every tagged virtual computing resource), as in block 640. As in block 650, ownership of the virtual computing resources may be transferred from the ownership transfer account to the second customer account.

Figure 7:
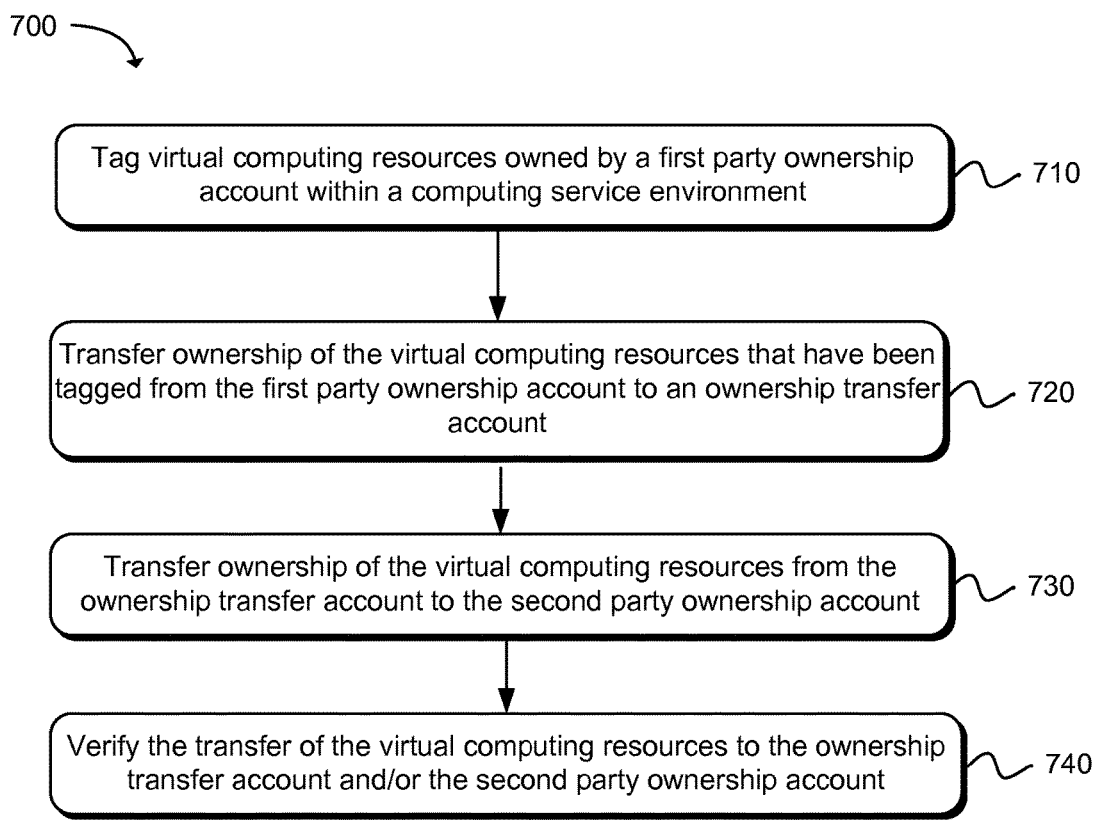
FIG. 7 is a flowchart of an example method for secure transfer of virtual computing resources between a first party ownership account and a second party ownership account within a computing service environment according to an example of the present technology.

Turning now to FIG. 7, a flow diagram illustrates an example method 700 for a transfer service for secure transfer of virtual computing resources. The functionality may be implemented as a method executed as instructions on a machine, where the instructions are included on at least one computer readable medium or one non-transitory machine-readable storage medium. Starting in block 710, virtual computing resources owned by a first party ownership account may be tagged within a computing service environment. In one aspect, the first party ownership account may be associated with a first customer computing environment and the second party ownership account may be associated with a second customer computing environment. The virtual computing resources may include at least one of computing instances, application resources, networking resources, data storage resources, or a combination thereof.

In one aspect, a transfer request may be issued for transferring the virtual computing resources owned by the first party ownership account to the ownership transfer account and/or to the second party ownership account. That is, a notification can be sent to accept or deny the transferring of ownership of the virtual computing resources from the first party ownership account to the ownership transfer account and/or to the second party ownership account.

For example, the second party ownership account can send the first party ownership account a request to transfer one or more virtual computing resources owned by the first party ownership account to the second party ownership account. Alternatively, the first party ownership account can send the second party ownership account a request for permission to transfer one or more virtual computing resources owned by the first party ownership account to the second party ownership account. The request may then be accepted and/or denied by the first party ownership account if the request is sent from the second party ownership account. Alternatively, the request may then be accepted and/or denied by the second party ownership account if the request is sent from the first party ownership account.

If the request is accepted, an ownership transfer account can be created and access permission can be exclusively granted, such as, for example, to the first party ownership account (e.g., a source party ownership account). The ownership transfer account is configured to enable the transfer of virtual computing resources between the first party ownership account and the second party ownership account (e.g., a source party ownership account) within a service provider network hosted within a service provider environment. Also, the acceptance of the issued request can trigger the tagging operation, as described in block 710. The ownership transfer account can be a single-tenant account.

As in block 720, ownership of the virtual computing resources that have been tagged may be transferred from the first party ownership account to an ownership transfer account, as in block 720. The transfer of the ownership may occur in the ownership tables of a control plane of the service provide environment.

As in block 730, ownership of the virtual computing resources may then be transferred from the ownership transfer account to the second party ownership account.

In one aspect, configuration data may be sent to the ownership transfer account to enable the virtual computing resources to be re-instantiated in the ownership transfer account. Moreover, the configuration data may be sent from the ownership transfer account to the second party ownership account and/or an instantiation service enable the virtual computing resources to be re-instantiated in the second party ownership account. For example, the configuration of a computing instance may be captured and used for re-instantiating the computing instance in the target ownership account (i.e., the second party ownership account). Alternatively, ownership records (e.g., ownership tags) of the virtual computing resources that have been tagged may be transferred from the first party ownership account to the ownership transfer account and the transferring of ownership of transfer records may be recorded in a control plane of the service provider environment.

In one aspect, a determination operation is executed to determine whether to transfer the tagged virtual computing resources that are owned by the first computing environment (e.g., the first party ownership account) to the ownership transfer account and/or from the ownership transfer account to the second computing environment (e.g., the second party ownership account) by a transfer type that is at least one of 1) a hot transfer (e.g., where the virtual computing resources are still executing in the service provider environment while the ownership of the virtual computing resources is being transferred), 2) a suspended execution of the virtual computing resources (e.g., the virtual computing resources are static), and/or 3) a configuration transfer where configuration data is transferred to the ownership transfer account for being re-instantiated in the ownership transfer account. Once the determination is made, the virtual computing resources are transferred according to either the 1) the hot transfer, 2) the suspended execution transfer of the virtual computing resources, and/or 3) the configuration transfer, as described herein.

For example, the ownership of the virtual computing resources may be dynamically transferred according to the hot transfer where the virtual computing resources are still executing in the service provider environment while the ownership of the virtual computing resources is being transferred. Alternatively, the ownership of the virtual computing resources may be transferred while the virtual computing resources are static where the virtual computing resources are not executing in the service provider environment while the ownership of the virtual computing resources is being transferred. If the virtual computing resources are to be transferred while the virtual computing resources are static, each of the virtual computing resources on the first party ownership account that are executing or in operation are terminated prior to transferring ownership of the virtual computing resources.

As in block 740, the transfer of the virtual computing resources to the ownership transfer account and/or second party ownership account may be verified. In one aspect, the transfer of the virtual computing resources to the ownership transfer account may be verified by the transfer service prior to transferring ownership of the virtual computing resources form the ownership account to the second party ownership account. In one aspect, after the virtual computing resources are transferred, the first party ownership account may be given full access to the transfer ownership account to verify the transfer. Alternatively, after the virtual computing resources are transferred, the second party ownership account may be given full access to the transfer ownership account to verify the transfer. The first party ownership account and/or the second party ownership account may use the transfer service to perform this operation. Also, the first party ownership account and/or the second party ownership account may perform any additional configuration that might be needed following the transfer.

In one alternative configuration, a list of tagged virtual computing resources may be maintained for those virtual computing resources that are to be transferred. As part of the verification operation, a transfer service may compare the tagged virtual computing resources that have been transferred to the list of those virtual computing resources were marked or tagged for transfer (prior to the transfer operation). If the tagged virtual computing resources that have been transferred matches those virtual computing resources marked or tagged for transfer on the list of tagged virtual computing resources then the transfer can be verified and acknowledged as complete. Alternatively, if the number of tagged virtual computing resources that have been transferred does not match the list of those virtual computing resources marked or tagged for that particular and specified transfer, the verification operation may be considered as an incomplete or a failed transfer. At that point, a transfer service may attempt to re-transfer those remaining or "left-behind" tagged virtual resources from the first party ownership account to the ownership transfer account. A second verification operation may be performed to verify if the transfer operation successfully completed transfer of each and every tagged virtual computing resource.

Furthermore, access permissions to the ownership transfer account may be removed from the first party ownership account to enable access to the ownership transfer account by the second party ownership account. For example, upon verification that each of the tagged virtual computing resources have been successfully transferred to the ownership transfer account, the access permissions to the ownership transfer ownership account may be removed from the first party ownership account. The access permissions to the ownership transfer account may then be exclusively granted to the second party ownership account.

As part of any operation of transferring the tagged virtual computing resources, an audit trail may be maintained for each and every transfer of ownership of the one or more of virtual computing resources. The audit trail notification may be provided to the first party ownership account and the second party ownership account. For example, the audit trail notification may be dynamically provided to the first party ownership account and/or to the second party ownership account upon each and every transfer operation of the virtual computing resources. Alternatively, the audit trail notification may be provided to the first party ownership account and/or to the second party ownership account on demand based on access permissions to the ownership transfer account for each and every transfer operation of the virtual computing resource.

Figure 8:
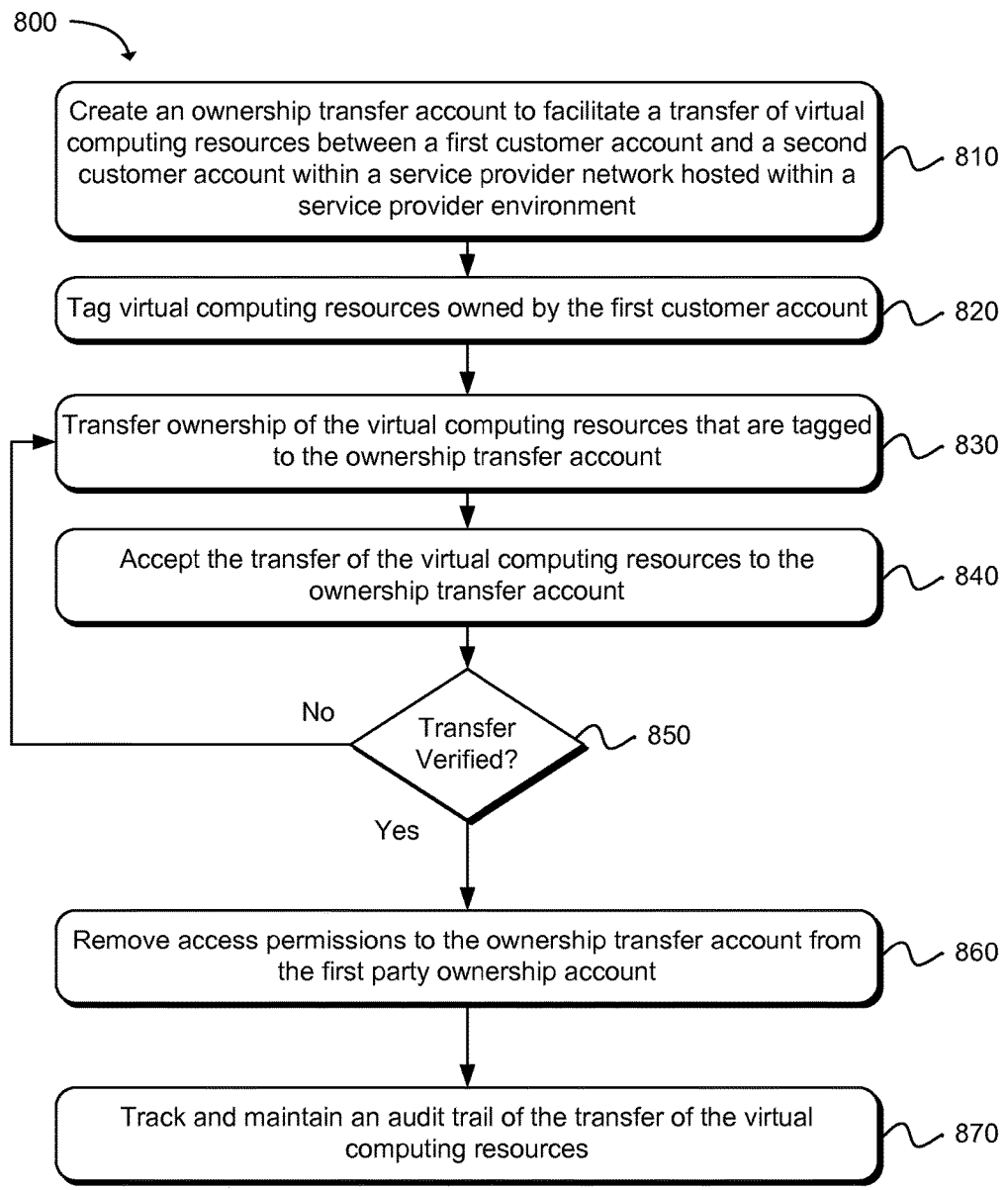
FIG. 8 is a flowchart of an example method for secure transfer and verification of transfer of virtual computing resources between a first customer account and a second customer account according to an example of the present technology.

Moving now to FIG. 8, a flow diagram illustrates an example method 800 for secure transfer of virtual computing resources. Starting in block 810, an ownership transfer account may be created to facilitate a transfer of virtual computing resources between a first customer account and a second customer account within a service provider network hosted within a service provider environment. The ownership transfer account may be created by a service provider environment, third party application, third party computing device, third party vendor, and/or combination thereof. The virtual computing resources owned by the first customer account may be tagged, as in block 820. The virtual computing resources may include computing instances, computing service images, networking resources, storage resources, and/or a combination thereof.

Ownership of the virtual computing resources that are tagged may be transferred to an ownership transfer account, as in block 830. In one aspect, for example, prior to creating the ownership transfer account, as described in block 810, a request may be issued by either the first customer account or by the second customer account for transferring the virtual computing resources owned by the first customer account. The ownership transfer account may be a single tenant account. For example, upon creation of the ownership transfer account, access permissions are granted exclusively to the first customer account while excluding the second customer account from access in the newly created ownership transfer account. In one example case, the ownership of the virtual computing resources may be transferred from the first customer account to the ownership transfer account by sending configuration data to the ownership transfer account to enable virtual computing resource to be re-instantiated in the ownership transfer account.

As in block 840, transfer of the virtual computing resources may be accepted by the ownership transfer account. As in block 850, a determination may be made to verify that each of the tagged virtual computing resources have been successfully transferred to the ownership transfer account. If no, the ownership of the virtual computing resources that are tagged may be re-transferred to the ownership transfer account, as in block 830. If yes, access permissions to the ownership transfer account are removed from the first customer account, as in block 860. Access permissions may be exclusively transferred and granted to the second customer account following removal of the access permissions to the ownership transfer account from the first customer account.

The ownership of the virtual computing resources may be transferred from the ownership transfer account to the second customer account by sending configuration data to the ownership transfer account to enable virtual computing resource to be re-instantiated in the second customer account. The transfer of the virtual computing resources to the ownership transfer account may be tracked and maintained in an audit trail, as in block 870.

Figure 9:
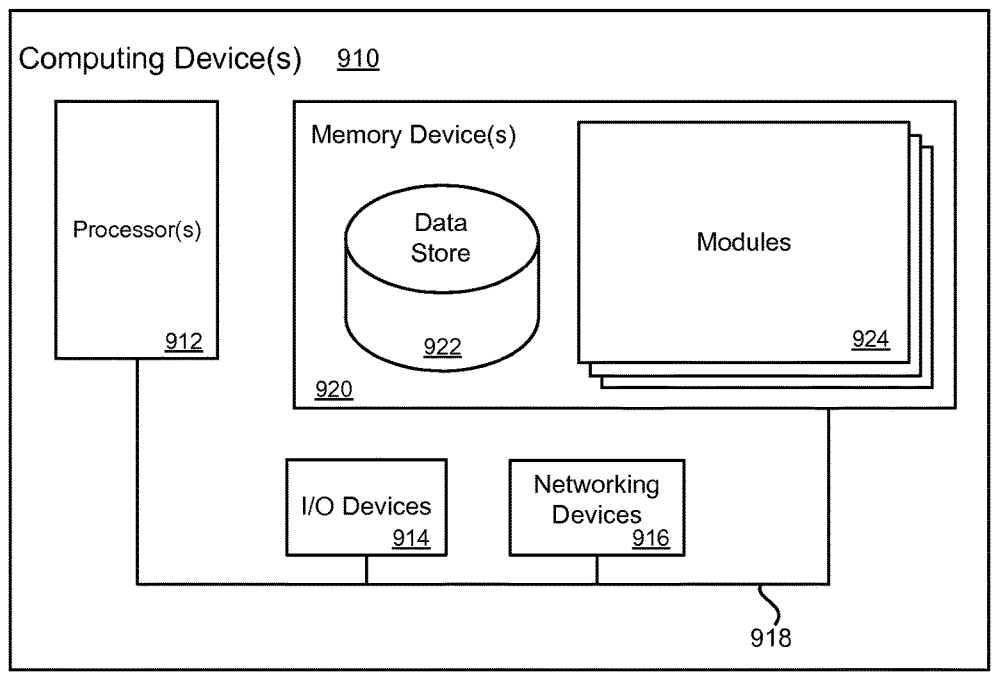
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 924. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the Internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid-state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for a secure transfer of cloud resources, the method comprising:
   under control of at least one processor and memory configured with executable instructions:
   creating an ownership transfer account configured to enable a transfer of virtual computing resources between a first customer account and a second customer account within a service provider network hosted within a service provider environment, using the at least one processor and memory;
   tagging virtual computing resources that are executable in the service provider environment and owned by the first customer account, using the at least one processor and memory;
   transferring ownership of the virtual computing resources that are tagged to the ownership transfer account, using the at least one processor and memory;
   verifying the transfer of the ownership of the virtual computing resources to the ownership transfer account, using the at least one processor and memory;
   transferring ownership of the virtual computing resources from the ownership transfer account to the second customer account, using the at least one processor and memory; and
   executing the virtual computing resources in the service provider environment, using the at least one processor and memory.

2. The method of claim 1, further comprises receiving a transfer request for the virtual computing resources owned by the first customer account, wherein the first customer account includes a first customer computing environment and the second customer account includes a second customer computing environment.

3. The method of claim 1, further comprises configuring the virtual computing resources for the second customer account subsequent to transferring ownership of the virtual computing resources from the ownership transfer account to the second customer account, wherein the ownership transfer account is a single-tenant account.

4. A computer-implemented method, the method comprising:
under control of at least one processor and memory configured with executable instructions:
tagging virtual computing resources owned by a first party ownership account within a computing service environment, using the at least one processor and memory;
transferring ownership of the virtual computing resources that have been tagged from the first party ownership account to an ownership transfer account, using the at least one processor and memory;
transferring ownership of the virtual computing resources from the ownership transfer account to a second party ownership account, using the at least one processor and memory, wherein the first party ownership account is inaccessible to the second party ownership account; and
executing the virtual computing resources in the computing service environment, using the at least one processor and memory.

5. The method of claim 4, further comprising issuing a transfer request for the virtual computing resources owned by a first customer to the ownership transfer account, using the at least one processor and memory.

6. The method of claim 4, further comprising creating the ownership transfer account to receive a transfer of virtual computing resources between the first party ownership account and the second party ownership account within a service provider environment, using the at least one processor and memory.

7. The method of claim 4, further comprises transferring ownership records of the virtual computing resources that have been tagged from the first party ownership account to the ownership transfer account and recording the transferring of ownership of transfer records in a control plane, using the at least one processor and memory.

8. The method of claim 4, further comprises transferring ownership of the virtual computing resources by sending configuration data to the ownership transfer account to enable virtual computing resource to be re-instantiated in the second party ownership account, using the at least one processor and memory.

9. The method of claim 4, wherein the ownership transfer account is a single-tenant account.

10. The method of claim 4, further comprises verifying the transfer of the ownership of the virtual computing resources by comparing the virtual computing resources that are transferred to a list of the virtual computing resources that were tagged previously for transfer, using the at least one processor and memory.

11. The method of claim 9, further comprises removing access permissions from the first party ownership account to the ownership transfer account to enable access to the ownership transfer account by the second party ownership account, using the at least one processor and memory.

12. The method of claim 4, wherein the virtual computing resources include at least one of computing instances, computing service images, networking resources, storage resources, or a combination thereof.

13. The method of claim 4, further comprises dynamically transferring ownership of the virtual computing resources according to a hot transfer where the virtual computing resources are still executing in the computing service environment while the ownership of the virtual computing resources is being transferred, using the at least one processor and memory.

14. The method of claim 4, further comprises transferring ownership of the virtual computing resources while the virtual computing resources are static where the virtual computing resources are not executing in the computing service environment while the ownership of the virtual computing resources is being transferred, using the at least one processor and memory.

15. The method of claim 14, further comprises terminating or suspending execution of each of the virtual computing resources on the first party ownership account prior to transferring ownership of the virtual computing resources, using the at least one processor and memory.

16. The method of claim 4, further comprises maintaining an audit trail for transfer of ownership of the virtual computing resources, using the at least one processor and memory.

17. The method of claim 16, further comprises providing an audit trail notification to the first party ownership account or the second party ownership account, using the at least one processor and memory.

18. The method of claim 14, further comprises sending a notification to the second party ownership account to accept or deny the transferring of ownership of the virtual computing resources from the first party ownership account, using the at least one processor and memory.

19. A method for providing secure transfer of virtual computing resources within a computing environment, the method comprising:
under control of at least one processor and memory configured with executable instructions that:
create an ownership transfer account to facilitate transfer of virtual computing resources between a first customer account and a second customer account within a service provider network hosted within a service provider environment, using the at least one processor and memory;
tag virtual computing resources that are executable in the service provider environment and owned by the first customer account, using the at least one processor and memory;
determine whether to transfer the tagged virtual computing resources that are owned by the first computing environment to the ownership transfer account by a transfer type that is at least one of: a hot transfer, a suspended execution of the virtual computing resources, or a configuration transfer where configuration data is transferred to the ownership transfer account, using the at least one processor and memory;
transfer ownership of the virtual computing resources that are tagged to the ownership transfer account according to the transfer type, using the at least one processor and memory;
verify the transfer of the ownership of the virtual computing resources to the ownership transfer account, using the at least one processor and memory;
transfer ownership of the virtual computing resources from the ownership transfer account to the second customer account by sending configuration data to the ownership transfer account; and
execute the virtual computing resources in the service provider environment, using the at least one processor and memory.

20. The method of claim 19, further comprising executable instructions that transfer ownership of the virtual computing resources from the ownership transfer account to the second customer account by sending at least a portion of the configuration data to the ownership transfer account to enable virtual computing resources to be re-instantiated in the second customer account, using the at least one processor and memory.

* * * * *